(12) United States Patent
Kota et al.

(10) Patent No.: US 7,420,551 B2
(45) Date of Patent: *Sep. 2, 2008

(54) IMAGE DISPLAY APPARATUS WITH DRIVING MODES AND METHOD OF DRIVING THE SAME

(75) Inventors: Atsushi Kota, Tokyo (JP); Shingo Kawashima, Tokyo (JP); Eitaro Nishigaki, Tokyo (JP)

(73) Assignee: Samsung SDI Co., Ltd., Suwon (KR)

( * ) Notice: Subject to any disclaimer, the term of this patent is extended or adjusted under 35 U.S.C. 154(b) by 533 days.

This patent is subject to a terminal disclaimer.

(21) Appl. No.: 10/965,744

(22) Filed: Oct. 18, 2004

(65) Prior Publication Data

US 2005/0057462 A1   Mar. 17, 2005

Related U.S. Application Data

(63) Continuation of application No. 09/974,855, filed on Oct. 12, 2001, now Pat. No. 7,176,912.

(30) Foreign Application Priority Data

Oct. 13, 2000   (JP)   ............................ 2000/314351

(51) Int. Cl.
G09G 5/00   (2006.01)

(52) U.S. Cl. ........................... 345/211; 345/77; 345/208

(58) Field of Classification Search .................... 345/76, 345/77, 204, 208, 211–213; 315/157; 348/602
See application file for complete search history.

(56) References Cited

U.S. PATENT DOCUMENTS

| | | | |
|---|---|---|---|
| 4,485,379 A | 11/1984 | Kinoshita et al. | 345/79 |
| 4,982,183 A * | 1/1991 | Flegal et al. | 345/79 |
| 5,027,036 A | 6/1991 | Ikarashi et al. | |
| 5,049,865 A | 9/1991 | Nakamura et al. | |
| 5,699,085 A * | 12/1997 | Takei et al. | 345/531 |
| 5,898,417 A | 4/1999 | Kanno et al. | |

(Continued)

FOREIGN PATENT DOCUMENTS

EP   0617399 A1   9/1994

(Continued)

Primary Examiner—Richard Hjerpe
Assistant Examiner—Tom V. Sheng
(74) Attorney, Agent, or Firm—H.C. Park & Associates, PLC

(57) ABSTRACT

An image display apparatus includes an image display section in which a plurality of light emitting elements are arranged in a matrix at intersections of a plurality of scan lines and a plurality of data lines. A control circuit selects one of modes as an operation mode in response to a mode switching signal, and outputs a data signal and a scan control signal based on an image signal to be displayed and the selected mode. A row driving section is connected to the plurality of scan lines to sequentially drive the plurality of scan lines based on the scan control signal in a unit determined based on the operation mode. A column driving section is connected to the plurality of data lines to sequentially drive the plurality of data lines based on the data signal. In this way, an image corresponding to the image signal is displayed on the image display section.

42 Claims, 9 Drawing Sheets

U.S. PATENT DOCUMENTS

| | | | |
|---|---|---|---|
| 6,069,597 A | 5/2000 | Hansen | |
| 6,081,250 A | 6/2000 | Shimada et al. | 345/94 |
| 6,211,854 B1 | 4/2001 | Fujiyoshi | 345/10 |
| 6,265,833 B1 | 7/2001 | Kim et al. | 315/169.3 |
| 6,310,651 B1 | 10/2001 | Mizutome | |
| 6,326,935 B1 | 12/2001 | Boger | 345/3.2 |
| 6,373,460 B1 | 4/2002 | Kubota et al. | 345/100 |
| 6,426,595 B1 | 7/2002 | Odake et al. | 315/169.1 |
| 6,559,819 B1 | 5/2003 | Rumbaugh et al. | 345/75.2 |
| 6,577,302 B2 | 6/2003 | Hunter et al. | 345/204 |
| 7,176,912 B2 * | 2/2007 | Kota et al. | 345/211 |
| 2001/0026283 A1 | 10/2001 | Yoshida et al. | 345/600 |
| 2001/0048482 A1 | 12/2001 | Takemoto | 348/564 |
| 2004/0196275 A1 * | 10/2004 | Hattori | 345/204 |

FOREIGN PATENT DOCUMENTS

| | | |
|---|---|---|
| JP | S59-225683 | 12/1984 |
| JP | 61-264876 | 11/1986 |
| JP | H01-123293 | 5/1989 |
| JP | H06-037889 | 5/1994 |
| JP | 08-254964 | 10/1997 |
| JP | 09-269752 | 10/1997 |
| JP | 09-281463 | 10/1997 |
| JP | H11-119877 | 4/1999 |
| JP | 2000-010529 | 1/2000 |
| JP | 2000-105573 | 4/2000 |
| JP | 2000-112435 | 4/2000 |
| JP | 2000-163016 | 6/2000 |
| WO | 99-53472 | 10/1999 |

* cited by examiner

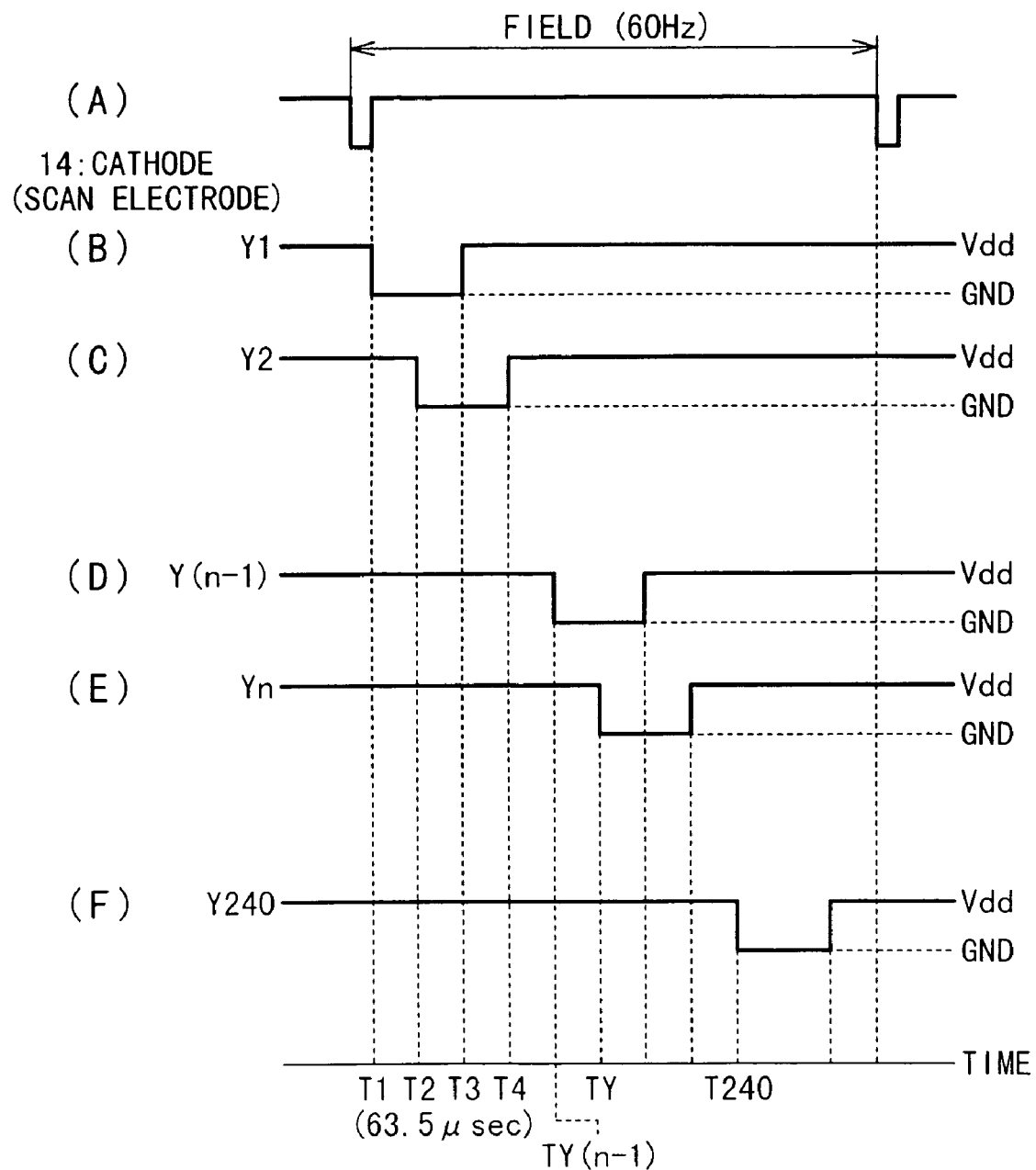

IMAGE DISPLAY APPARATUS WITH DRIVING MODES AND METHOD OF DRIVING THE SAME

CROSS REFERENCE

This application is a continuation application of Applicant's U.S. patent application Ser. No. 09/974,855 filed on Oct. 12, 2001, now U.S. Pat. No. 7,176,912 which is herein specifically incorporated by reference in its entirety.

BACKGROUND OF THE INVENTION

1. Field of the Invention

The present invention relates to an image display apparatus and a method of driving the same.

2. Description of the Related Art

The demand of display apparatuses remarkably increases in recent years. Especially, flat-panel display apparatuses such as a liquid crystal display apparatus (LCD) or a plasma display apparatus (PD) are greatly expected. As one of the flat-panel display apparatuses, a light emitting type image display apparatus such as an electroluminescence (EL) display apparatus has a high visibility and is superior in a view angle. The light emitting type image display apparatus does not need a backlight, unlike the LCD apparatus. Also, attention is paid to an organic electroluminescence image display apparatus as a plane type display apparatus excellent in response characteristics.

As a driving system of a dot matrix type display apparatus using light emitting elements, there are a simple matrix driving system and an active matrix driving system. In the simple matrix driving system, usually, scan electrodes (scan lines) as cathode electrodes and data electrodes (data-lines) as transparent anodes electrodes are arranged to intersect each other. The light emitting element is arranged to be put between the scan electrode and the data electrode. In case of the above-mentioned simple matrix driving system, a light emitting time is shortened as the number of scan electrodes increases. As a result, a duty ratio becomes smaller. Therefore, the brightness of the organic EL display apparatus decreases.

In case of a single scan driving system, scan electrodes are sequentially scanned one by one so as to drive light emitting elements. Therefore, when the number of scan electrodes increases, the duty ratio becomes small, so that the brightness of the organic EL display apparatus decreases in inverse proportion to the number of scan electrodes. For example, in case of an organic EL display apparatus of a QVGA class, when the number of scan electrodes is 240 and the duty ratio is 1/240. At this time, the brightness of the display apparatus is about 70 cd/m². In viewpoint of the brightness, it is difficult to view the display apparatus in a situation other than a dark situation like night.

A driving system called a double scan driving system is known against the single scan driving system. In the double scan driving system, scan electrodes on a row side are sequentially driven two by two to increase the brightness of the display apparatus. For example, in case of a color organic EL display apparatus of the QVGA class, horizontal scan lines are equally grouped into two groups of 120 scan lines. One scan line of each of the two groups is driven for one scan drive time and the duty ratio is 1/120. Such a double scan driving system is disclosed in Japanese Laid Open Patent Application (JP-A-Showa 61-264876). In the double scan driving system, the brightness of the organic EL display apparatus can be improved. However, the brightness which is higher than the brightness achieved in the double scan drive system is sometimes required. Also, the double scan driving system needs the power consumption larger than the single scan driving system.

In case of the organic EL element, the emitted light brightness is proportional to a current density in the light emitting pixel. Therefore, to increase the brightness of the organic EL display apparatus, a method is employed in which the drive voltage of the organic EL element is increased so that the current density of the organic EL element is increased. In this method, however, the increase of the drive voltage shortens a life of the organic EL element. Also, it is necessary to provide a voltage adjusting circuit every scan electrode or data electrode. Therefore, the circuit structure becomes complicated and the control becomes complicated. As a result, the cost of the product increases.

As described above, in case of driving an image display apparatus in accordance with the simple matrix driving system, conventionally, it is necessary to change the drive voltage or a pulse duration to change the brightness and power consumption of the display apparatus. However, the circuit for changing the pulse duration is complicated.

Also, conventionally, as the row scanning method in the simple matrix driving system, only the single scanning system and the double scanning system are provided.

Moreover, in the conventional image display apparatus, only one of the single scanning system and the double scanning system is fixedly adopted.

In conjunction with the above description, an image display apparatus is disclosed in Japanese Laid Open Patent Application (JP-A-Showa 61-264876). In this reference, phosphor is applied on a screen to emit light when an electron beam is irradiated. An electron beam source generates an electron beam for each of vertical sections obtained by dividing the screen into a vertical direction. A dividing section divides the electron beam for each of horizontal sections obtained by dividing the screen into a horizontal direction. A polarizing electrode polarizes the electron beam in a plurality of steps in each of the vertical direction and the horizontal direction on the way of a path from the electron beam source to the screen. A beam control electrode controls a current quantity of the electron beam to be irradiated on the screen for every horizontal section, and controls the light quantity from each pixel on the screen. A focusing electrode controls the size of the electron beam on the phosphor screen of each pixel. A back electrode controls a quantity of the electron beam from the electron beam source. An acceleration electrode accelerates the electron beam to the screen. The beam control electrode is equally divided into an upper portion and a lower portion in the vertical direction, and signals shifted by ½ field are applied to the upper and lower portions of the beam control electrode.

Also, a method of setting a frame frequency in a liquid crystal display apparatus is disclosed in Japanese Laid Open Patent Application (JP-A-Heisei 9-281463). In this reference, the display apparatus includes a plurality of display elements driven by a plurality of scan lines and a plurality of data lines, respectively. The liquid crystal display apparatus selects h of the scan lines (h is an integer equal to or more than 2) at the same time. A frame frequency is set in accordance with the response speed of liquid crystal material.

Also, a liquid crystal driving circuit is disclosed in Japanese Laid Open Patent Application (JP-A-Heisei 9-269752). In this reference, the liquid crystal driving circuit has an output potential for duty drive as frame time divisional drive and an output potential for static drive as frame drive, and outputs one of the output potentials from the output terminal.

Also, an electric field radiation color display apparatus is disclosed in Japanese Laid Open Patent Application (JP-A-Heisei 8-254964). The electric field radiation color display apparatus has a frame memory which stores picture data formatted for a frame sequential display. A switching section switches a mode between a usual power consumption mode and a reduced power consumption mode. When the display apparatus is in the reduced power consumption mode, a section carries out a monochromatic display. In the monochromatic display, the frame memory is bypassed. In addition, in the above reference, a display system is composed of an emitter plate addressable in a matrix and 3-color positive plate. In the reduced power consumption mode, the display apparatus is switched from a color mode to the monochromatic mode. By a power reducing unit, green brightness data for a monochromatic display bypasses the frame memory and is connected from the first multiplexer to the second multiplexer directly through a 3-state buffer. The buffer brings about the separation of a bypass line in case of a color display. Because the frame memory can be bypassed in case of the monochromatic display, the power of 1 W can be reduced from the frame memory in a standby mode.

Also, a display apparatus is disclosed in Japanese Laid Open Patent application (P2000-105573A). In this reference, the display apparatus is composed of a substrate, electrodes on the substrate, and an organic light emitting layer put between the electrodes. A display region is divided into a first display region on which a predetermined data is always displayed, and a second display region on which data corresponding to a specific situation is displayed.

Also, a display apparatus is disclosed in Japanese Laid Open Patent application (P2000-112435A). In this reference, the matrix type display apparatus has a function to activate a region of a display region and to inactivate the other region of the display region. At least one of the position, area size, and display contents of the activated display region can be changed for every predetermined time interval.

SUMMARY OF THE INVENTION

An object of the present invention is to provide an image display apparatus in which power consumption and brightness can be adjusted, and a method of driving the same.

Another object of the present invention is to provide an image display apparatus in which power consumption and brightness can be adjusted in accordance with a request from a user, and a method of driving the same.

Still another object of the present invention is to provide an image display apparatus, in which power consumption and brightness can be adjusted in accordance with the peripheral circumstances, a power remaining quantity or a display content, and a method of driving the same.

Yet still another object of the present invention is to provide an image display apparatus which operates to notify a warning to a user and a method of driving the same.

In an aspect of the present invention, an image display apparatus includes an image display section in which a plurality of light emitting elements are arranged in a matrix at intersections of a plurality of scan lines and a plurality of data lines. A control circuit selects one of modes as an operation mode in response to a mode switching signal, and outputs a data signal and a scan control signal based on an image signal to be displayed and the selected mode. A row driving section is connected to the plurality of scan lines to sequentially drive the plurality of scan lines based on the scan control signal in a unit determined based on the operation mode. A column driving section is connected to the plurality of data lines to sequentially drive the plurality of data lines based on the data signal. In this way, an image corresponding to the image signal is displayed on the image display section.

Here, the row driving section may sequentially drive the plurality of scan lines one by a first one in one of the modes based on the scan control signal. Also, when the image display section is divided into an upper section and a lower section, the row driving section may sequentially drive the plurality of scan lines one by one in each of the upper and lower sections in a second one of the modes based on the scan control signal. Also, the image display section is divided into an upper section and a lower section, the row driving section may sequentially drive the plurality of scan lines N by N (N is an integer more than 1) in each of the upper and lower sections in a third one of the modes based on the scan control signal. In addition, the row driving section may sequentially drive the plurality of scan lines N by N (N is an integer more than 1) in each of the upper and lower sections in a fourth one of the modes based on the scan control signal.

In this case, the control circuit may output the data signal to the column driving section such that the image display section displays the image in a monochromatic color in the first mode.

Also, the control circuit may output the scan control signal to the row driving section such that the scan electrodes of the upper section are scanned from an upper end to a lower end and such that the scan electrodes of the lower section are scanned from an upper end to an lower end. Also, the control circuit may output the scan control signal to the row driving section such that the scan electrodes of the upper section are scanned from an upper end to a lower end and such that the scan electrodes of the lower section are scanned from a lower end to an upper end. Also, the control circuit may output the scan control signal to the row driving section such that the scan electrodes of the upper section are scanned from a lower end to an upper end and such that the scan electrodes of the lower section are scanned from an upper end to a lower end. Otherwise, the control circuit may output the scan control signal to the row driving section such that the scan electrodes of the upper section are scanned from a lower end to an upper end and such that the scan electrodes of the lower section are scanned from a lower end to an upper end.

Also, the image display apparatus may further include an external brightness sensor which detects brightness of a peripheral portion of the image display apparatus, and a CPU which outputs the mode switching signal and the image signal to the control circuit based on designation by a user, and outputs the mode switching signal to the control circuit based on the detected brightness by the external brightness.

Also, the image display apparatus may further include a remaining charge detecting unit which detects a remaining charge quantity of a battery, and a CPU which outputs the mode switching signal and the image signal to the control circuit based on designation by a user, and outputs the mode switching signal to the control circuit based on the detected remaining charge quantity by the remaining charge detecting unit.

Also, the image display apparatus may further include a receiving unit which receives a call, and a CPU which outputs the mode switching signal and the image signal to the control circuit based on designation by a user, and outputs the mode switching signal to the control circuit when the call is received by the receiving unit.

Also, the image display apparatus may be an electroluminescence image display apparatus.

BRIEF DESCRIPTION OF THE DRAWINGS

FIG. 10 is timing charts showing an operation of the image display apparatus in a second embodiment in a single sequential scan mode.

DESCRIPTION OF THE PREFERRED EMBODIMENTS

Hereinafter, an image display apparatus of the present invention will be described.

The image display apparatus such as a color organic EL display apparatus in a mobile phone according to the first embodiment of the present invention will be described with reference to FIG. 1. The image display apparatus of the present invention can change the brightness of display and the power consumption. The image display apparatus in the first embodiment has three operation modes of a single scan mode, a double scan mode, and a double sequential scan mode, as shown in FIG. 2. By switching those modes appropriately, the brightness of the display and the power consumption are changed.

Figure 1:
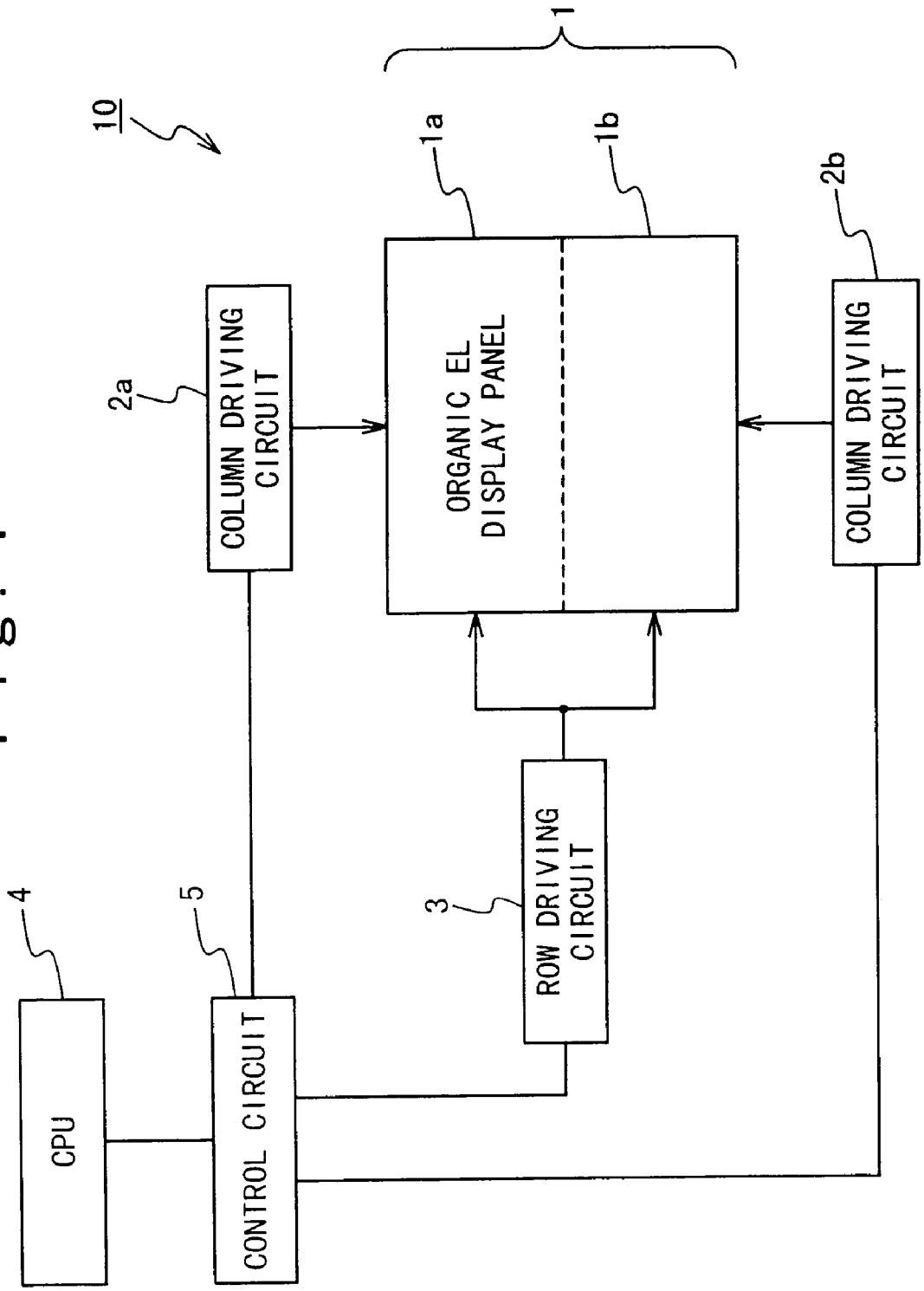
FIG. 1 is a block diagram showing an image display apparatus of a QVGA class in a mobile phone according to a first embodiment of the present invention.
Figure 2:
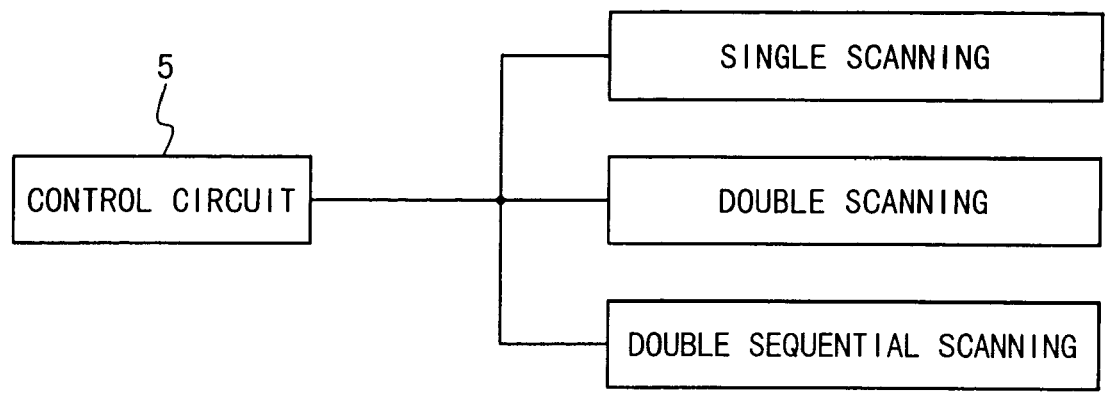
FIG. 2 is a schematic block diagram showing that a control circuit generates a control signal for switching an operation mode between predetermined modes.

FIG. 1 is a block diagram showing the color organic EL display apparatus as the image display apparatus with a simple matrix driving system in the first embodiment. As shown in Fig. 1, the color organic EL display apparatus 10 is composed of a color organic EL display apparatus panel as an image display section 1 of a QVGA class using an NTSC signal, column driving circuits 2a and 2b for driving data lines as columns, a row driving circuit 3 for driving scan lines as rows, a CPU 4 and a control circuit 5.

The organic EL display apparatus panel 1 is divided into two portions: an upper portion as a first image display section 1a and a lower portion as a second image display section 1b. The column driving circuits 2a and 2b are provided for the first image display section 1a and the second image display section 1b to drive the columns. The row driving circuit 3 can supply the same timing signals to the first image display section 1a and the second image display section 1b. In this case, in the double scan mode and the double sequential scan mode which are described later, the images are displayed on the first image display section 1a and the second image display section 1b in the organic EL display apparatus panel 1, respectively. Therefore, the column driving circuits 2a and 2b must be provided for the first image display section 1a and the second image display section 1b, respectively. On the other hand, the row driving circuit 3 is sufficient to supply the same timing signal to the first and second image display sections 1a and 1b.

Figure 3:
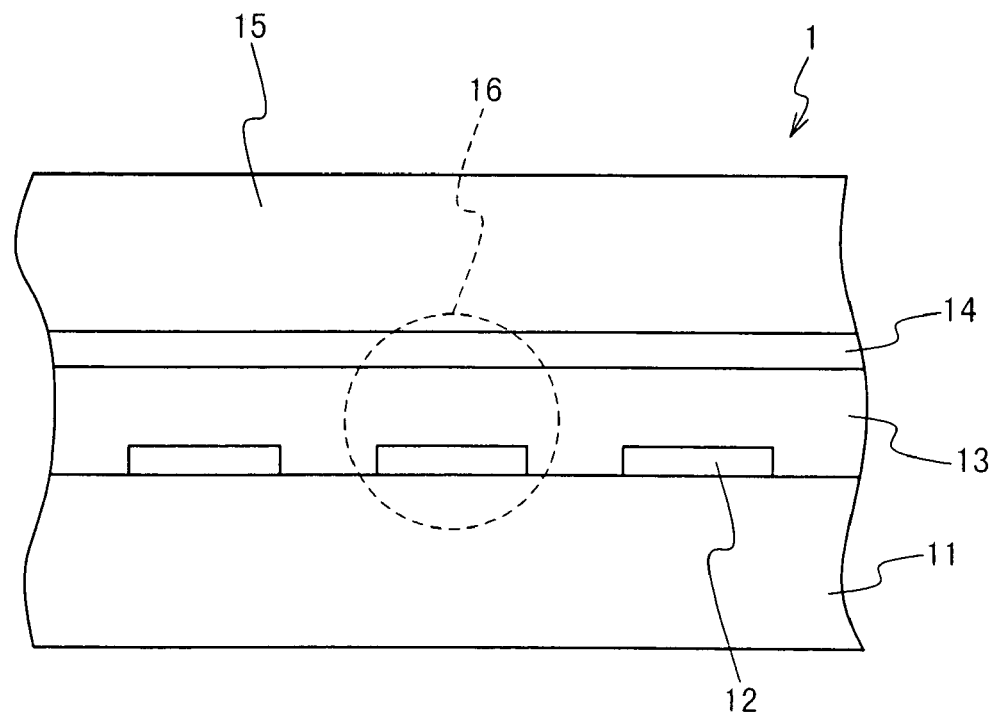
FIG. 3 is a cross sectional view showing the image display apparatus in the first embodiment.

As shown in FIG. 3, the color organic EL display apparatus panel 1 is composed of data electrodes 12 as anodes formed on a transparent substrate 11 of glass and so on as striped transparent electrodes, an organic EL film as a light emitting layer 13, and scan electrodes 14 as cathodes formed of striped metal electrodes. A transparent substrate 15 of glass is provided onto the scan electrodes 14. The data electrodes 12 and the scan electrodes 14 are formed to have a matrix structure in which they are orthogonal to each other. Then, an organic EL pixel or organic EL element 16 is formed at the intersection of the data electrode 12 and the scan electrode 14.

Figure 4:
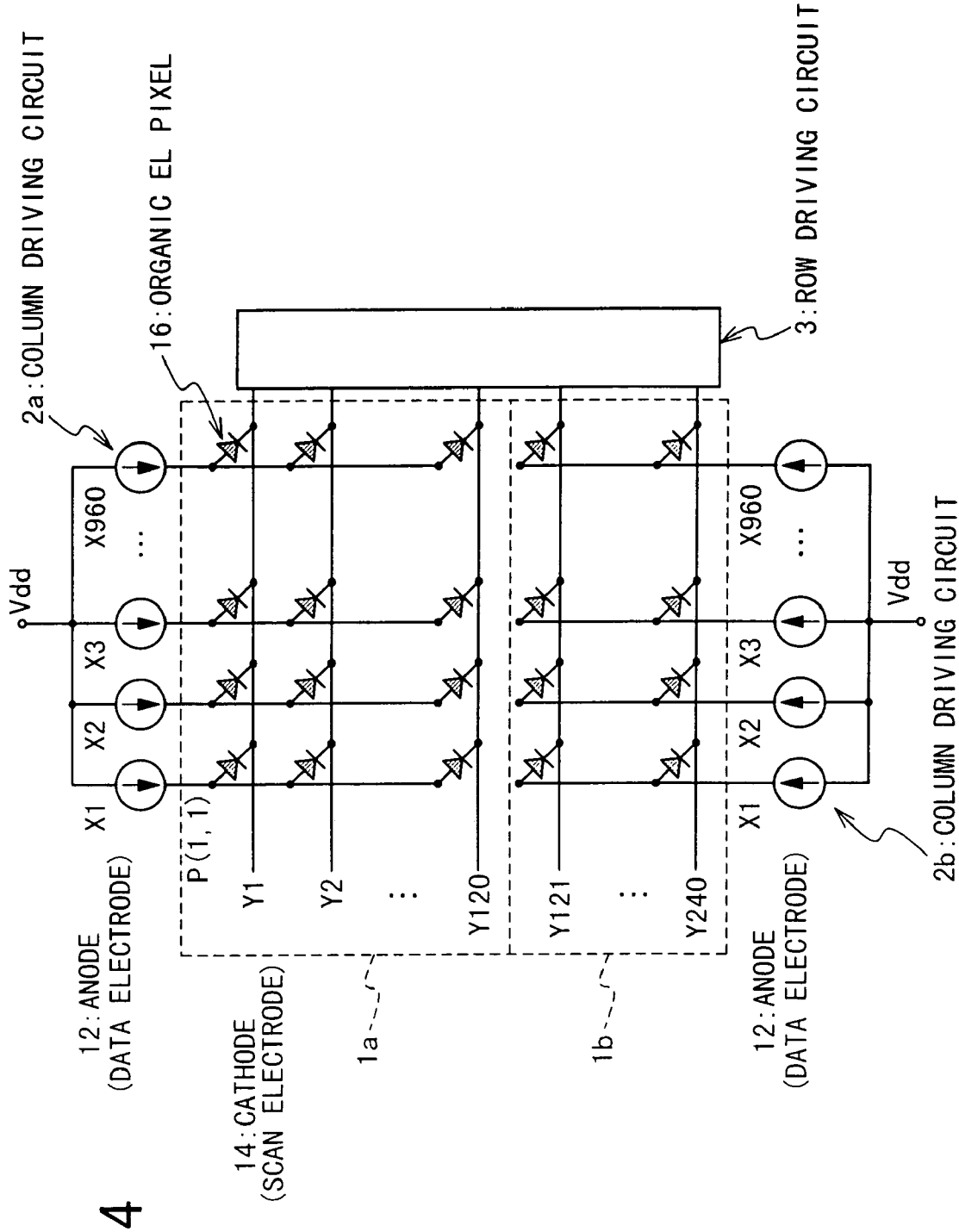
FIG. 4 is a matrix diagram showing the image display apparatus in the first embodiment.

As shown in FIG. 4, the plurality of data electrodes 12 are driven by the column driving circuits 2a and 2b and the plurality of scan electrodes 14 are driven by the row driving circuit 3.

The column driving circuits 2a and 2b drive the data electrodes of the organic EL display apparatus panel 1 based on data signals supplied from the control circuit 5. Moreover, the column driving circuits 2a and 2b convert the data signals into signals in which current values are determined based on the voltage levels of the data signal, and supplies current of a current density to the organic EL pixel 16 of the organic EL display apparatus panel 1 for display of an image.

The row driving circuit 3 drives the scan lines of the organic EL display apparatus panel 1 based on a control signal supplied from the control circuit 5 for the display image. In the method of driving the scan lines in the first embodiment, the connection of the scan electrode is switched between a power supply potential, a ground potential or a middle potential. The row driving circuit 3 operates based on either of the following methods. In the first method, the scan electrode is connected to the ground potential in case of the drive state and to the power supply potential in case of the non-drive state. In second method, the scan electrode is connected to the power supply potential in case of the drive state and to the ground potential in case of the non-drive state. Also, in the third method, the scan electrode is connected to the ground potential or the power supply potential in case of the drive state and to the middle potential in case of the non-drive state. Also, in the fourth method, the scan electrode is connected to the middle potential in case of the drive state and to the ground potential or the power supply potential in case of the non-drive state. In the first embodiment, the first method is applied.

In the first embodiment, the control circuit 5 generates the control signal for driving the color organic EL display apparatus panel 1 in either of the above three operation modes in response to a mode switching signal from the CPU 4 and outputs the control signal to the row driving circuit 3. Also, the control circuit 5 generates and outputs a scan control signal to the row driving circuit 3 and data signals to the column driving circuits 2a and 2b based on an image signal supplied from the CPU 4 in accordance with the operation mode which is determined in response to the mode switching signal.

FIG. 4 is a diagram showing the matrix structure of the organic EL display apparatus panel 1 of the QVGA class in the first embodiment. As shown in FIG. 4, the number of scan electrodes 14 is 240 and the number of data electrodes 12 is 960 (=320×3 (RGB)) in the QVGA class.

Also, the organic EL pixels 16 are put between the scan electrodes 14 and the data electrodes 12 in a matrix. The data electrodes 12 is divided into a first image display section from the first scan electrode to the 120-th scan electrode and a second image display section from the 121st scan electrode to the 24o-th scan electrode. The column driving circuits 2a and 2b are connected with the first image display section 1a on the upper side and the second image display section 1b on the lower side, respectively. Moreover, the row driving circuit 3 is connected with the first and second image display sections 1a and 1b.

Figure 5:
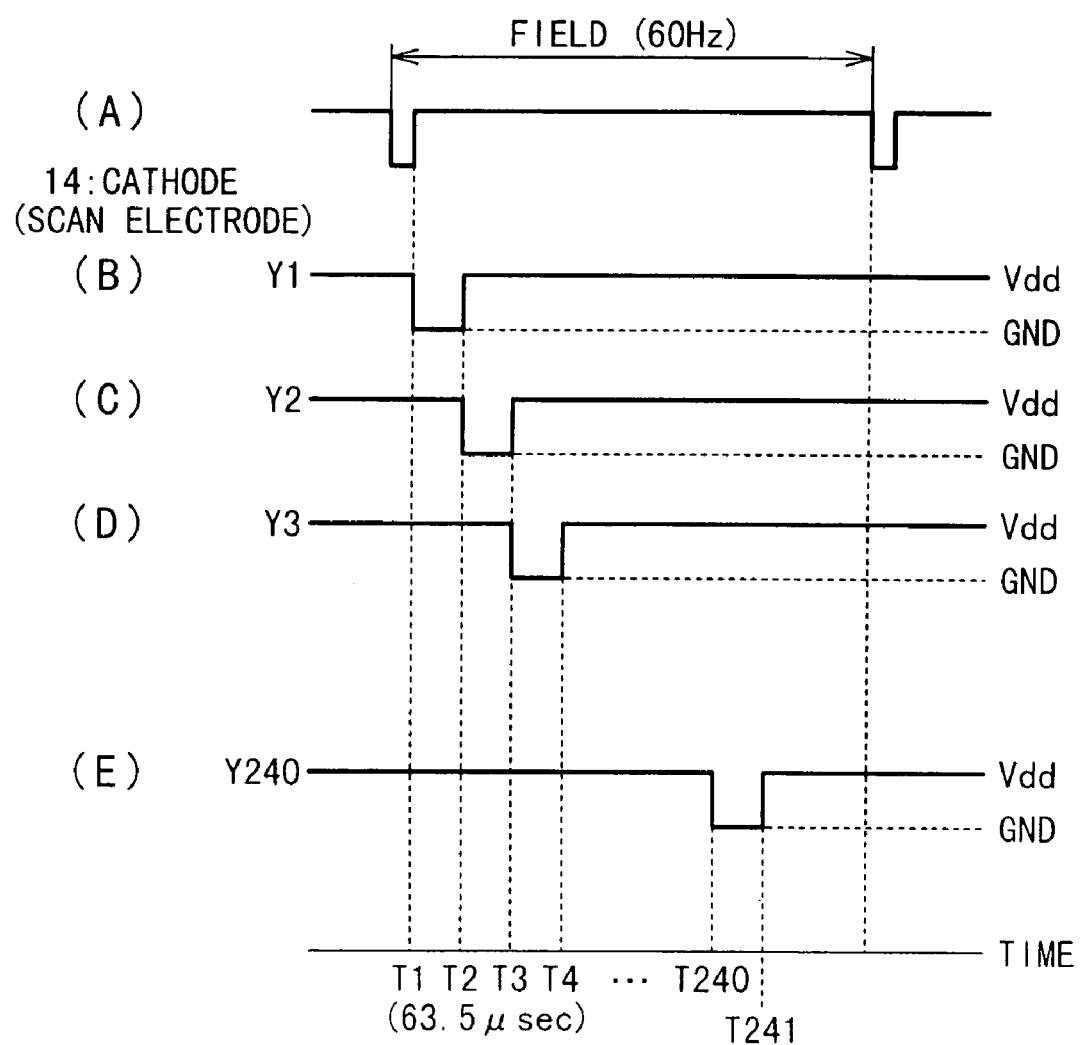
FIG. 5 is timing charts showing an operation of the image display apparatus in the first embodiment in a single scan mode.

First, the single scan mode will be described with reference to FIG. 5. FIG. 5 is timing charts showing the operation of the single scan driving system. FIG. 5 shows a row scan signal when the scan electrodes are driven one by one based on the scan control signal with the NTSC format as an NTSC signal. The NTSC signal has a vertical sync frequency of 60 Hz and a horizontal synchronization frequency (period) of 15.75 kHz (63.5 µs).

As shown in FIG. 5, in the single scan driving system, the scan electrodes 14 are driven in order by the row driving circuit 3. In this case, since the 240 scan electrodes Y1 to Y240 are driven in order one by one for one screen, the duty ratio is 1/240. In the-single scan driving system, the driven scan electrode is always one.

Next, a double scan mode (driving system) will be described with reference to FIG. 6.

Figure 6:
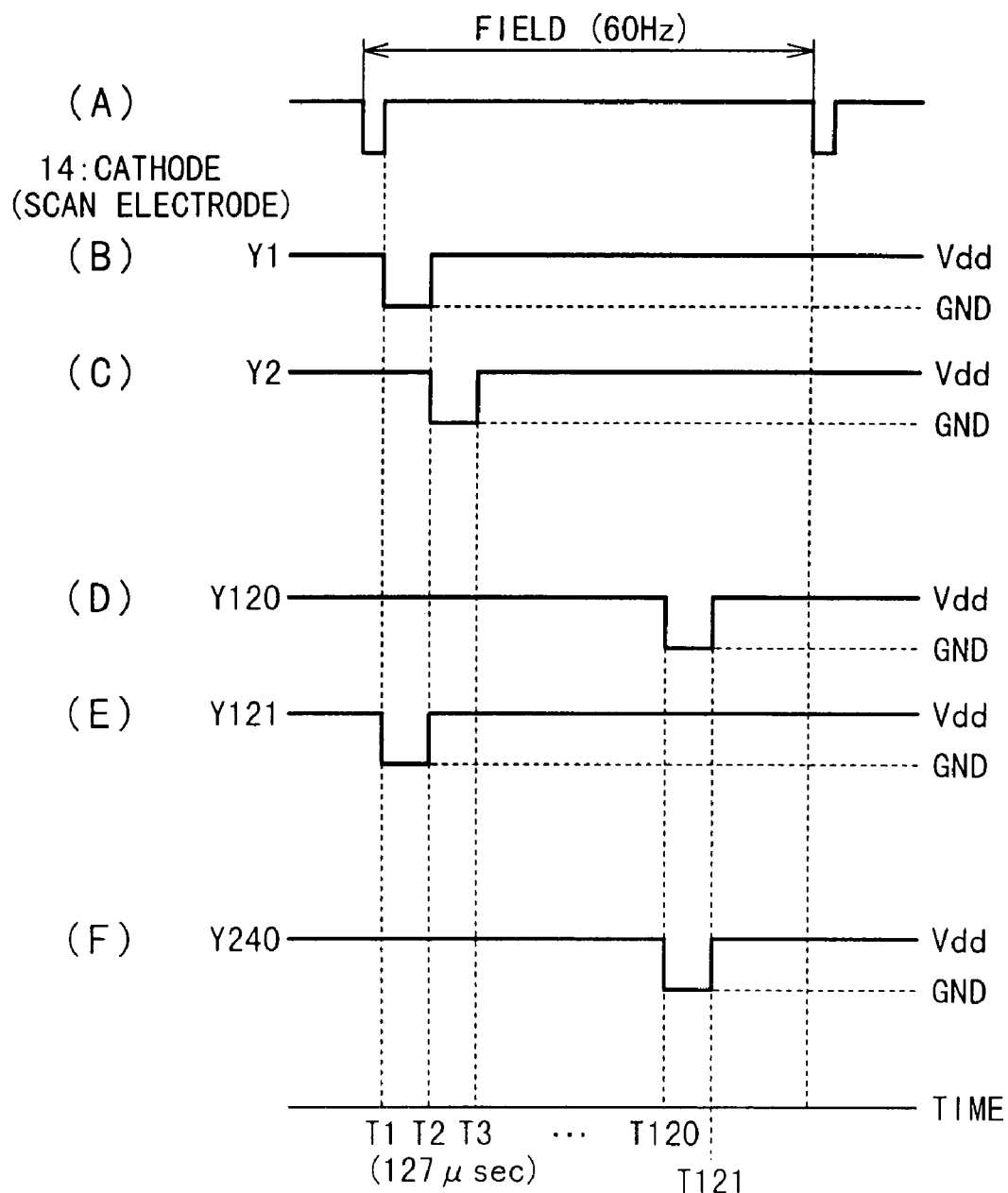
FIG. 6 is timing charts showing an operation of a double scan mode in the first embodiment.

FIG. 6 is timing charts showing the operation of the row driving circuit 3 in the double scan driving system. The NTSC signal is used, as in the case shown in FIG. 5.

In the double scan driving system, the two scan electrodes are always driven at the same time to increase the brightness of the display. In case of the organic EL display apparatus panel 1 of the QVGA class in this embodiment, the scan electrodes Y1 to Y240 are equally divided into the first image display section 1a of the scan electrodes Y1 to Y120 and the second image display section 1b of the scan electrodes Y121 to Y240 in the vertical direction, as mentioned above. The number of scan electrodes is 120 in each of the first and second image display sections. The one display screen is formed by scanning the first and second image display sections once. Therefore, the duty ratio is 1/120. That is, as shown in FIG. 6, in the double scan driving system, two scan electrodes Y1 and Y121 are driven at the same time. Then, two scan electrodes are driven in order, as the scan electrode Y2 and Y122, Y3 and Y123, ..., Y120 and Y240. In the double scan driving system, because the two scan electrodes are driven at the same time, the brightness of organic EL display apparatus panel 1 becomes twice as bright, as compared with that of the single scan driving system. Also, the power consumption doubles, too.

Figure 7:
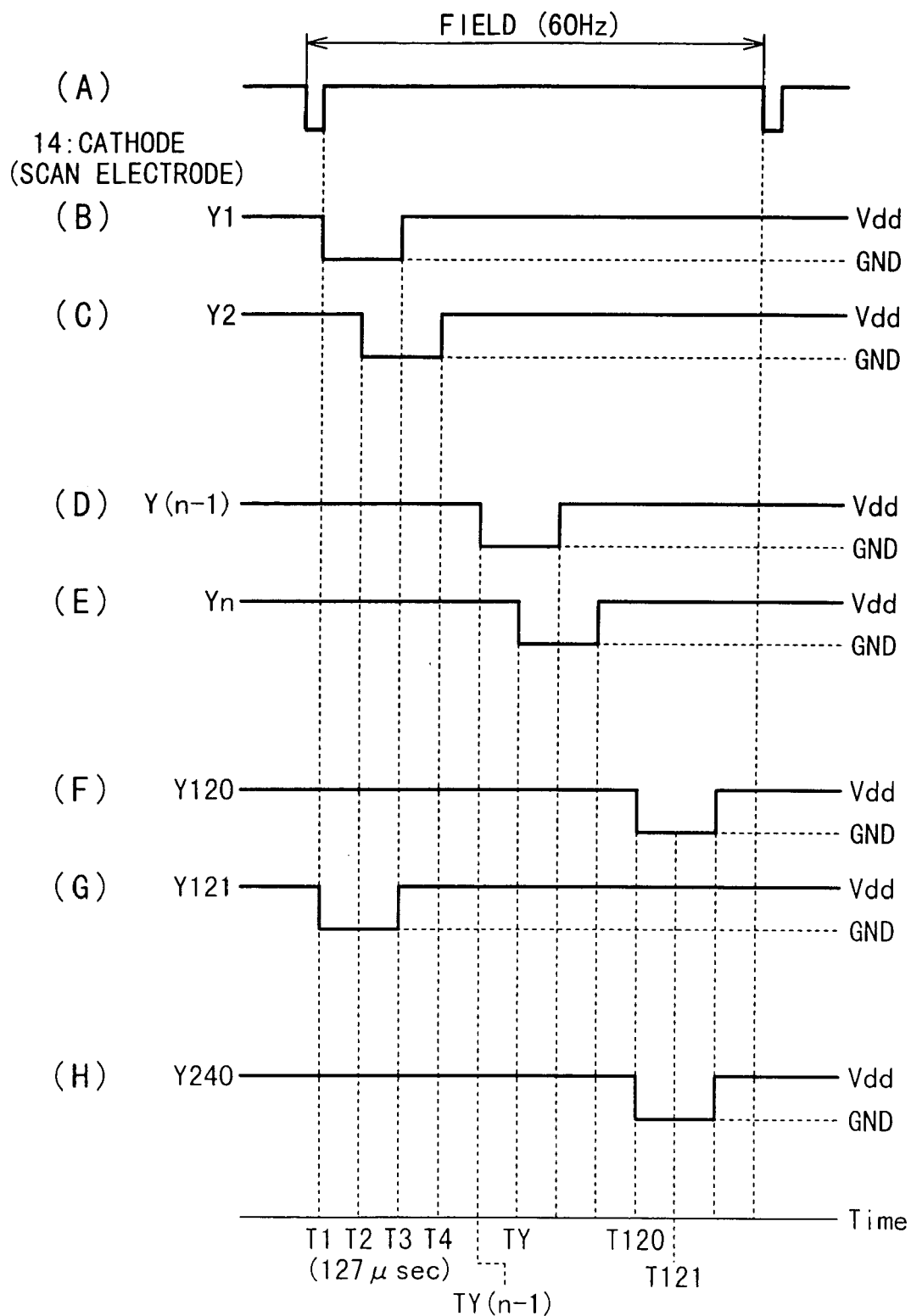
FIG. 7 is timing charts showing an operation of the image display apparatus in the first embodiment in a double sequential scan mode.

Next, a double sequential scan mode (driving system) will be described with reference to FIG. 7. FIG. 7 is timing charts showing the operation of the row driving circuit 3 in the double sequential scan driving system. In FIG. 7, the NTSC signal is used and the four scan electrodes 14 are driven at the same time.

In the double sequential scan driving system, when the scan control signal is supplied to the row driving circuit 3 to drive the organic EL display apparatus panel 1, the n-th and (n−1)-th scan electrodes 14 in the first image display section 1a are driven. At the same time, the (n+120)-th and (n+119)-th scan electrodes 14 in the second image display section 1b are driven. The scan electrodes to be scanned are changed in order. At the same time supply of the row scan signal to the first and second image display section, the data signals are supplied to the column driving circuits 2a and 2b, respectively. Current with the current density of twice of that of the single scan driving system is applied to each of the data electrodes 12 for the organic EL pixels 16 of the organic EL display apparatus panel 1. Thus, the image of image portions 1a and 1b is displayed.

Here, the operation of the row driving circuit 3 in the double sequential scan driving system will be described more specifically. The first image display section 1a in the organic EL display apparatus panel 1 will be described. Because the operation of the second image display section 1b is same as the operation of the first image display section 1a, the description is omitted.

In the first image display section 1a, when the organic EL pixel 16 is connected with the scan electrode Y1, the organic EL pixel 16 is turned on during the time periods T1 and T2. When the organic EL pixel 16 is connected with the scan electrode Y2, organic EL pixel 16 is turned on during the time periods T2 and T3. Therefore, during the time period T2, the scan electrodes Y1 and Y2 are driven at the same time based on the data signal. The organic EL pixel 16 is connected with these scan electrodes Y1 and Y2, and turned on at the same time. In the same way, during the time periods T3 and T4, the scan electrodes Y2 and Y3 are driven at the same time based on the data signal.

Therefore, the image is expanded in upper and lower directions so that the resolution in the vertical direction becomes ½. However, actually, because the scan electrodes are driven in order one by one, the image is never expanded in the upper and lower directions and the resolution in the vertical direction never degrades to ½. Also, in case of a horizontal line data signal with one pixel width, the width of the horizontal line becomes twice, so that the resolution becomes ½. However, the resolution in the horizontal direction is not degraded at all. Therefore, in case of a natural image such as a video picture, as far as the resolution is calculated by using data processing, it is found that the resolution in the vertical direction is degraded only to about 80%, as compared with the original resolution.

In the double sequential scan driving system, the row driving circuit 3 is supplied with the scan control signal to set the drive time of each scan electrode 14 to 254 µs which is twice the drive time of the double scan driving system. Moreover, the scan electrode 14 is shifted as Y1, Y2, Y3, ... one by one in order every 127 µs as in the double scan driving system. At this time, adjacent two of the scan electrodes Y1 to Y120 and corresponding two of the scan electrodes Y121 to Y240 are driven at the same time. Also, the data signals are supplied to the column driving circuits 2a and 2b to flow current with twice of the current density in the single scan driving system to the data electrode 12. As a result, change in the current density of the organic EL pixel 16 may be prevented.

Figure 8:
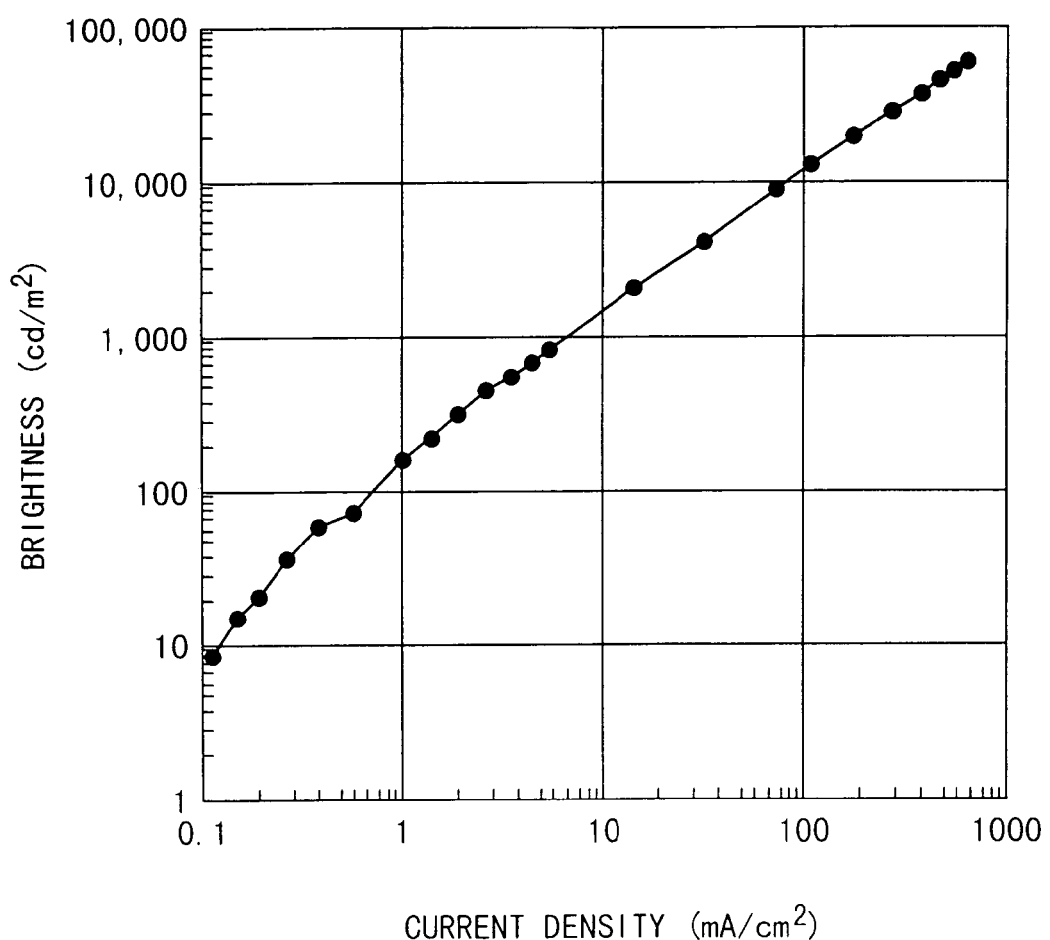
FIG. 8 is a diagram showing a relation of current density and pixel brightness in a pixel.

FIG. 8 is a diagram showing relation between the current density and the pixel brightness in the organic EL pixel. It could be understood that the organic EL pixel has approximately proportional relation between the current density and the pixel brightness. Therefore, to keep the brightness of the display panel constant, it is sufficient to keep the current density of the organic EL pixel constant.

In the double sequential scan driving system, the current which flows through the organic EL pixel 16 decreases to ½ and the panel brightness is decreased to ½, if the current supplied from the column driving circuit current is not changed. Therefore, in order to prevent the decrease in the brightness, the current supplied from the column driving circuit is doubled so that the current density of the organic EL pixel 16 is not changed.

Figure 9A:
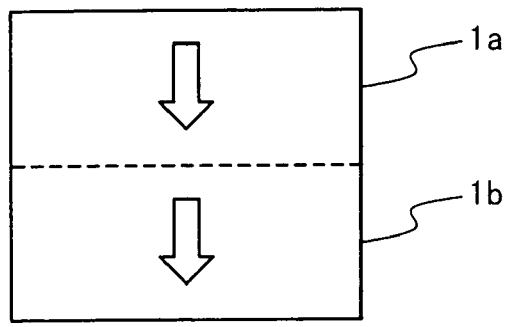
FIGS. 9A to 9D are schematic diagrams showing scan directions in the image display apparatus in the first embodiment in the double sequential scan mode.
Figure 9B:
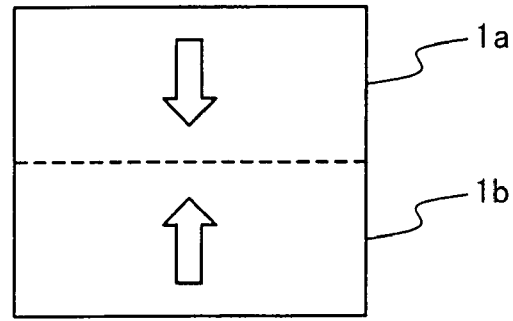
Figure 9C:
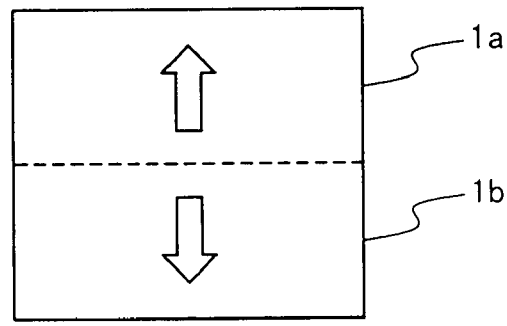
Figure 9D:
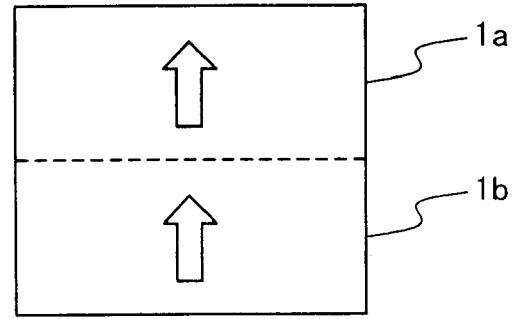

In the double sequential scan driving system in the first embodiment, as shown in FIG. 9A, the scan electrodes Y1 to Y120 and the scan electrodes Y121 to Y240 are driven in a downward direction from upper ends for the upper image 1a and lower image 1b. However, the scan electrodes Y121 to Y240 may be driven in an upward direction from the lower end for the upper image 1a and lower image 1b, as shown in 9B. Also, the scan electrodes Y1 to Y120 may be driven in the upward direction from the center and the scan electrodes Y121 to Y240 may be driven in the downward direction from the center for the upper side image 1a and lower side image 1b, as shown in 9C. Moreover, the scan electrodes Y1 to Y120 and Y121 to Y240 may be driven in the upward direction from the center and the lower end, as shown in 9D.

According to the double sequential scan driving system, two adjacent scan electrodes 14 of the organic EL display apparatus panel 1 are driven at the same time and the scan electrodes 14 are sequentially shifted in each of the first image display section 1a and the second image display section 1b. Therefore, the duty ratio can be easily changed from 1/120 to 1/60 (=2/120). In this way, the emitted light brightness of the display can be made twice easily in the double sequential scan driving system, compared with the double scan driving system. Also, the emitted light brightness of the display can be made four times very easily, compared with the single scan driving system.

Also, the degradation of the resolution in the vertical direction can be restrained in about 80% in the same way, compared with the double scan driving system. Also, the brightness of the organic EL display apparatus panel 1 can be adjusted by only a very simple operation in which the scan control signal supplied to the row driving circuit 3 and the data signals to the column driving circuits 2a and 2b from the control circuit 5 are changed.

According to the first embodiment, in the double sequential scan driving system, two or more of the scan electrodes 14 of the organic EL display apparatus panel 1 are driven at the same time and the scan electrodes 14 are sequentially shifted in each of the first image display section 1a and the second image display section 1b. Therefore, the duty ratio can be easily changed. In this way, it is possible to change the emitted light brightness so that the brightness that the coming to practical use can be sufficiently ensured.

Also, the number of scan electrodes 14 to be driven can be easily changed by the simple control data. Therefore, the brightness of the display can, be adjusted through the simple operation.

It should be noted that in the single scan driving system, it is possible to select the green light as a monochromatic light having the most efficient emission of 3-color lights of RGB. As such, the power consumption can be more suppressed than that of the single scan mode of the 3 color emitting light. In this case, the CPU 4 outputs to the control circuit 5, the mode switching signal to drive the organic EL display apparatus panel 1 in the single scan mode of the monochromatic light emission. The control circuit 5 receives the mode switching signal, and outputs the data signals for the monochromatic light emission to the column driving circuits 2a and 2b based on the image signal. The column driving circuits 2a and 2b set the current values of current sources corresponding to the pixels of R and B to zero in response to the data signals and stop the current supply. Because the organic EL pixel 16 does not emit light when the current does not flow through, the monochromatic light emission can be realized by the above-mentioned method.

Next, a method of switching between the above three modes will be described in the color organic EL display apparatus 10 having the above structure. For example, the methods (1) to (5) are thought.

Of the above three modes, the double scan mode is preset as a standard mode. In the single scan mode, the emitted light brightness and the power consumption are reduced to ½, compared with the standard mode. In the double sequential scan mode, the emitted light brightness and the power consumption become twice, compared with the standard mode.

(1) The user can appropriately switch between the three modes in accordance to the desire.

(2) In accordance with the brightness around the color organic EL display apparatus 10, one of the above three modes is automatically selected. An external brightness sensor (not shown) is connected with the CPU 4 and the detected brightness around the color organic EL display apparatus 10 is outputted to the CPU 4. Here, it is supposed that the standard mode is usually set. Also, it is supposed that one of the above three modes is set by the user though the method (1). In this case, the CPU 4 does not output the mode switching signal newly to the control circuit 5 when determining that the detected brightness by the external brightness sensor is equal to or higher than a brightness threshold value. Thus, the mode is not changed. On the other hand, the CPU 4 outputs the mode switching signal to the control circuit 5 to switch to the single scan mode, when determining that the detected brightness by the external brightness sensor is lower than the brightness threshold value. The control circuit 5 receives the mode switching signal and generates the scan control signal and the data signal to drive the organic EL display apparatus panel 1 in the single scan mode. Then, the control circuit 5 outputs the scan control signal to the row driving circuit 3 and the data signal to the column driving circuits 2a and 2b. For example, when the peripheral portion is dark as in night, the emitted light brightness can be visible sufficiently even if the brightness is low. According to the method (2), the operation mode is automatically switched to the single scan mode in case that the power consumption should be suppressed.

(3) When the color organic EL display apparatus 10 is driven with a battery cell, the operation mode is automatically switched between the above three modes based on a cell residual quantity. A cell residual quantity detection unit (not shown) is connected with the CPU 4, and the cell residual quantity in the color organic EL display apparatus 10 is detected by the cell residual quantity detection unit and is outputted to the CPU 4. In this case, it is supposed that the operation mode is preset to the standard mode. Also, a new operation mode is selected from the above three modes. In this case, the CPU 4 does not output a new mode switching signal to the control circuit 5, when determining that the detection value by the cell residual quantity detection unit is equal to or larger than a threshold value, and the mode set at the present time is kept. On the other hand, the CPU 4 outputs the mode switching signal to the control circuit 5 to instruct to switch to the single scan mode, when determining that the detection value by the cell residual quantity detection unit is smaller than the threshold value. The control circuit 5 receives the mode switching signal and generates the scan control signal and the data signals for driving the organic EL display apparatus panel 1 in the single scan mode and outputs the data signals to the column driving circuits 2a and 2b and the scan control signal to the row driving circuit 3. For example, when there are few cell residual quantities, the operation mode is automatically switched to the single scan mode as a power saving mode. Moreover, the user can find the decrease of the brightness when the operation mode is switched from either of the other two modes into the single scan mode. Thus, the user can recognize the necessity to charge the cell. In this case, moreover, the CPU 4 outputs the mode switching signal to the control circuit 5 to instruct the switching of the operation mode to the single scan mode for the monochromatic light emission of the above-mentioned green light, when determining that the detection value by the cell residual quantity detection unit is smaller than a specific value which is lower than the threshold value. With this, it is possible to drive the organic EL display apparatus panel 1 in the single scan mode of monochromatic green light emission. Moreover, in this case, it is possible to further suppress the power consumption. The user can find the change of the emitted light color and can recognize that there is necessity to charge the cell. The monochromatic color of the emitted light is not limited to the green and the user can set optionally.

(4) When a call is arrived, the operation mode may be automatically and repeatedly switched between the above three modes or two of them, in addition to or in place of the call arrival sound. Through the change of the brightness of the organic EL display apparatus panel 1, it is possible for the user to recognize the call arrival. In this case, the CPU 4 is connected with a call receiving unit (not shown).

Also, the emitted light may be automatically changed from the 3-color light to the monochromatic color light when there is a call arrival. The operation mode may be any of the three modes. Consequently, it is possible for the user to recognize the call arrival. In this case, it is possible for the user to recognize the call arrival through repetitive change of the emitted light color, because the emitted light is changed between three colors of RGB in addition to or in place of the call arrival sound.

Also, when there is a call arrival, an image may be displayed in the first image display section la and the second image display section 1*b* with different monochromatic colors of RGB, which are repetitively changed, in addition to or in place of the call arrival sound. Thus, the repetitive change of the image color is carried out between the plurality of screen regions of the organic EL display apparatus panel 1. As a result, the user can recognize the call arrival.

The operation which is carried out "when there is a call arrival" in the method (4) may be carried out in a manner mode instead of sounding the call arrival sound. Also, the repetitive switching operation of the method (4) may be carried out only when there is the call arrival from a preset person. Moreover, the repetition switching operation of the method (4) may be carried out in accordance with (in synchronization with the rhythm, tempo, and change of the melody of the call arrival sound.

(5) According to the contents to be displayed by the organic EL display apparatus panel 1, the operation mode may be automatically switched between the above three modes. For example, at the time of the so-called waiting state (in which there are not a call transmission and a call arrival), the operation mode is automatically switched into the single scan mode as the power saving mode of the 3-color or monochromatic color.

The embodiments of the image display apparatus and the driving method of the same of the present invention is described with reference to the drawings. However, the concrete structure of the present invention is not limited to these embodiments and a modification or change is possible in the range which is not apart from the spirit of the present invention. For example, in each of the above-mentioned embodiments, an organic EL element is used as the light emitting element, but an inorganic EL element, a light-emitting element, and a field emission device (FED) may be used. Also, in the method of driving the first image display section 1*a* and the second image display section 1*b* in the organic EL display apparatus in the double sequential scan mode, the number of adjacent scan electrodes to be driven at a time may be three or more. Further, the used video signal is not limited to the NTSC signal, but may be a PAL signal, a HDTV signal, a VGA signal, or a digital signal.

As described above, according to the present invention, the saving of the power consumption and the adjustment of the brightness can be carried out. In this case, it is possible to adjust based on the desire of the user. Also, the saving of the power consumption and the adjustment of the brightness can be carried out in accordance with the environment such as the brightness of a peripheral area to the display apparatus, the cell residual quantity and the display contents. Moreover, with change of the brightness or the emitted light, a report role of the warning to the user can be played.

It should be noted that in the above embodiments, the double scan driving system is adopted as the one which has the middle (standard) brightness of the above three modes. However, in place of the double scan driving system, the following single sequential scan driving system may be used.

FIG. 10 is the timing chart showing the operation of the row driving circuit 3 in the single sequential scan driving system. In FIG. 10, the NTSC signal is used as in the above embodiments.

As shown in FIG. 10, in the single sequential scan driving system of the organic EL display apparatus panel 1, a scan control signal is supplied from the control circuit 5 to the row driving circuit 3 such that the n-th scan electrode 14 and the (n−1)-th scan electrode of the organic EL display apparatus panel 1 are driven at the same time and the scan electrodes are sequentially scanned. At the same time, the data signals is supplied to the column driving circuits 2*a* and 2*b* such that twice of current is supplied to the data electrode 12 to prevent the change of the current density of each organic EL pixel 16 of the organic EL display apparatus panel 1. Thus, an image is displayed.

In the single sequential scan driving system, the scan control signal is supplied to the row driving circuit 3 such that the drive time of each scan electrode 14 is set to 127 µs which are usual twice, and the scan electrodes 14 is shifted one by one every 63.5 µs in order in such a manner as Y1, Y2, Y3, ..., Y240. The column driving circuits 2*a* and 2*b* are supplied with the data signal and are driven not to change the current density of the organic EL pixel 16 by applying twice of current to the data electrode 12 in the single scan driving system. That is, in the single sequential scan driving system, the row driving circuit 3 drives the two or more adjacent scan electrodes 14 at the same time. Thus, the horizontal section for several scan electrodes 14 is driven in the organic EL pixel 16 in order. The column driving circuits 2*a* and 2*b* control the current of the data electrodes 12 to prevent the change of the current density of the organic EL pixel 16.

In this single sequential scan driving system, like the double scan driving system, two scan electrodes are always driven. Therefore, the brightness and the power consumption are twice, compared with those of the single scan driving system, and the brightness and the power consumption are in the half, compared with the double sequential scan driving system. Also, in the single sequential scan driving system, the resolution in the vertical direction is degraded rather, like the double sequential scanning system. In viewpoint of the picture quality, it is more preferable to adopt the double scan driving system than the single sequential scan driving system.

In the above, the present invention is described in association with the mobile phone apparatus. However, the present invention can be applied to a display apparatus such as a car navigation system, in place of the mobile phone apparatus. In this way, according to the image display apparatus of the present invention, the power consumption and the brightness can be adjusted.

What is claimed is:

1. An image display apparatus, comprising:
   an image display section in which a plurality of light emitting elements are arranged in a matrix at intersections of a plurality of scan lines and a plurality of data lines;
   a control circuit selecting one of two operation modes as an operation mode in response to a mode switching signal, and outputting a data signal and a scan control signal based on an image signal to be displayed and the operation mode;
   a scan driving circuit connected to the plurality of scan lines to drive the plurality of scan lines based on the scan control signal in a unit determined based on the operation mode; and
   a data driving circuit connected to the plurality of data lines to sequentially drive the plurality of data lines based on the data signal,
   wherein the data signal outputted by the control circuit is determined by a number of simultaneously driven scan lines.

2. The image display apparatus of claim 1,
   wherein the operation mode includes driving the plurality of scan lines in each of a plurality of sections into which the image display section is divided.

3. The image display apparatus of claim 2, wherein the two operation modes include a first mode for driving the plurality of scan lines one by one and a second mode for driving the plurality of scan lines one by one in each of an upper section and a lower section into which the image display section is divided.

4. The image display apparatus of claim 3, wherein in the first mode, odd numbered scan lines are driven one by one and then even numbered scan lines are driven one by one.

5. The image display apparatus of claim 3, wherein in the second mode, odd numbered scan lines are driven one by one and then even numbered scan lines are driven one by one in the upper section and the lower section.

6. The image display apparatus of claim 2, wherein the two operation modes include a first mode for driving the plurality of scan lines one by one and a second mode for driving the plurality of scan lines in each of an upper section and a lower section into which the image display section is divided,
   wherein at least four scan lines are simultaneously driven in the second mode.

7. The image display apparatus of claim 2, wherein the two operation modes include a first mode for driving the plurality of scan lines one by one in each of an upper section and a lower section into which the image display section is divided and a second mode for driving the plurality of scan lines in each of an upper section and a lower section into which the image display section is divided,
   wherein at least four scan lines are simultaneously driven in the second mode.

8. The image display apparatus of claim 2, wherein the two operation modes include a first mode for driving the plurality of scan lines one by one in each of an upper section and a lower section into which the image display section is divided and a second mode for driving the plurality of scan lines,
   wherein at least two scan lines are simultaneously driven in the second mode.

9. The image display apparatus of claim 2, wherein the two operation modes include a first mode for driving the plurality of scan lines in each of an upper section and a lower section into which the image display section is divided and a second mode for driving the plurality of scan lines,
   wherein at least four scan lines are simultaneously driven in the first mode and at least two scan lines are simultaneously driven in the second mode.

10. The image display apparatus of claim 1, wherein the two operation modes include a first mode for driving the plurality of scan lines one by one and a second mode for driving the plurality of scan lines,
    wherein at least two scan lines are simultaneously driven in the second mode.

11. The image display apparatus of claim 1, further comprising:
    an external brightness sensor which detects brightness of a peripheral portion of the image display apparatus; and
    a CPU that outputs the mode switching signal and the image signal to the control circuit based on designation by a user, and outputs the mode switching signal to the control circuit based on the detected brightness by the external brightness.

12. The image display apparatus of claim 1, further comprising:
    a remaining charge detecting unit that detects a remaining charge quantity of a battery; and
    a CPU that outputs the mode switching signal and the image signal to the control circuit based on designation by a user, and outputs the mode switching signal to the control circuit based on the detected remaining charge quantity by the remaining charge detecting unit.

13. The image display apparatus of claim 1, further comprising:
    a receiving unit that receives a call; and
    a CPU that outputs the mode switching signal and the image signal to the control circuit based on designation by a user, and outputs the mode switching signal to the control circuit when the call is received by the receiving unit.

14. The image display apparatus of claim 1, wherein the image display apparatus is an electroluminescence image display apparatus.

15. A method for driving an image display apparatus comprised of an image display section formed by arranging a plurality of light emitting elements in a matrix at intersections of a plurality of scan lines and a plurality of data lines, comprising:
    selecting one of two operation modes as an operation mode in response to a mode switching signal,
    outputting a data signal and a scan control signal based on an image signal to be displayed and the operation mode,
    driving sequentially the plurality of scan lines based on the scan control signal in a unit determined based on the operation mode;
    sequentially driving the plurality of data lines based on the data signal,
    wherein the data signal outputted by the control circuit is determined by a number of simultaneously driven scan lines.

16. The method of claim 15, wherein the operation mode includes driving the plurality of scan lines in each of a plurality of sections into which the image display section is divided.

17. The method of claim 16, wherein the two operation modes include a first mode for driving the plurality of scan lines one by one and a second mode for driving the plurality of scan lines one by one in each of an upper section and a lower section into which the image display section is divided.

18. The method of claim 17, wherein in the second mode, the plurality of scan lines in the upper section are scanned from an upper end to a lower end and the plurality of scan lines in the lower section are scanned from an upper end to a lower end.

19. The method of claim 17, wherein in the second mode, the plurality of scan lines in the upper section are scanned from an upper end to a lower end and the plurality of scan lines in the lower section are scanned from a lower end to an upper end.

20. The method of claim 17, wherein in the second mode, the plurality of scan lines in the upper section are scanned from a lower end to an upper end and the plurality of scan lines in the lower section are scanned from an upper end to a lower end.

21. The method of claim 17, wherein in the second mode, the plurality of scan lines in the upper section are scanned from a lower end to an upper end and the plurality of scan lines in the lower section are scanned from a lower end to an upper end.

22. The method of claim 16, wherein the two operation modes include a first mode for driving the plurality of scan lines one by one and a second mode for driving the plurality of scan lines in each of an upper section and a lower section into which the image display section is divided,
wherein at least four scan lines are simultaneously driven in the second mode.

23. The method of claim 22, wherein in the second mode, the plurality of scan lines in the upper section are scanned from an upper end to a lower end and the plurality of scan lines in the lower section are scanned from an upper end to a lower end.

24. The method of claim 22, wherein in the second mode, the plurality of scan lines in the upper section are scanned from an upper end to a lower end and the plurality of scan lines in the lower section are scanned from a lower end to an upper end.

25. The method of claim 22, wherein in the second mode, the plurality of scan lines in the upper section are scanned from a lower end to an upper end and the plurality of scan lines in the lower section are scanned from an upper end to a lower end.

26. The method of claim 22, wherein in the second mode, the plurality of scan lines in the upper section are scanned from a lower end to an upper end and the plurality of scan lines in the lower section are scanned from a lower end to an upper end.

27. The method of claim 16, wherein the two operation modes include a first mode for driving the plurality of scan lines one by one in each of an upper section and a lower section into which the image display section is divided and a second mode for driving the plurality of scan lines in each of an upper section and a lower section into which the image display section is divided,
wherein at least four scan lines are simultaneously driven in the second mode.

28. The method of claim 27, wherein in the first and second mode, the plurality of scan lines in the upper section are scanned from an upper end to a lower end and the plurality of scan lines in the lower section are scanned from an upper end to a lower end.

29. The method of claim 27, wherein in the first and second mode, the plurality of scan lines in the upper section are scanned from an upper end to a lower end and the plurality of scan lines in the lower section are scanned from a lower end to an upper end.

30. The method of claim 27, wherein in the first and second mode, the plurality of scan lines in the upper section are scanned from a lower end to an upper end and the plurality of scan lines in the lower section are scanned from an upper end to a lower end.

31. The method of claim 27, wherein in the first and second mode, the plurality of scan lines in the upper section are scanned from a lower end to an upper end and the plurality of scan lines in the lower section are scanned from a lower end to an upper end.

32. The method of claim 16, wherein the two operation modes include a first mode for driving the plurality of scan lines one by one in each of an upper section and a lower section into which the image display section is divided and a second mode for driving the plurality of scan lines,
wherein at least two scan lines are simultaneously driven in the second mode.

33. The method of claim 32, wherein in the first mode, the plurality of scan lines in the upper section are scanned from an upper end to a lower end and the plurality of scan lines in the lower section are scanned from an upper end to a lower end.

34. The method of claim 32, wherein in the first mode, the plurality of scan lines in the upper section are scanned from an upper end to a lower end and the plurality of scan lines in the lower section are scanned from a lower end to an upper end.

35. The method of claim 32, wherein in the first mode, the plurality of scan lines in the upper section are scanned from a lower end to an upper end and the plurality of scan lines in the lower section are scanned from an upper end to a lower end.

36. The method of claim 32, wherein in the first mode, the plurality of scan lines in the upper section are scanned from a lower end to an upper end and the plurality of scan lines in the lower section are scanned from a lower end to an upper end.

37. The method of claim 16, wherein the two operation modes include a first mode for driving the plurality of scan lines in each of an upper section and a lower section into which the image display section is divided and a second mode for driving the plurality of scan lines,
wherein at least four scan lines are simultaneously driven in the first mode and at least two scan lines are simultaneously driven in the second mode.

38. The method of claim 37, wherein in the first mode, the plurality of scan lines in the upper section are scanned from an upper end to a lower end and the plurality of scan lines in the lower section are scanned from an upper end to a lower end.

39. The method of claim 37, wherein in the first mode, the plurality of scan lines in the upper section are scanned from an upper end to a lower end and the plurality of scan lines in the lower section are scanned from a lower end to an upper end.

40. The method of claim 37, wherein in the first mode, the plurality of scan lines in the upper section are scanned from a lower end to an upper end and the plurality of scan lines in the lower section are scanned from an upper end to a lower end.

41. The method of claim 37, wherein in the first mode, the plurality of scan lines in the upper section are scanned from a lower end to an upper end and the plurality of scan lines in the lower section are scanned from a lower end to an upper end.

42. The method of claim 15, wherein the two operation modes include a first mode for driving the plurality of scan lines one by one and a second mode for driving the plurality of scan lines,
wherein at least two scan lines are simultaneously driven in the second mode.

* * * * *